US011441509B2

(12) United States Patent
Wu et al.

(10) Patent No.: US 11,441,509 B2
(45) Date of Patent: Sep. 13, 2022

(54) FUEL INJECTOR TEMPERATURE MITIGATION

(71) Applicant: WESTPORT FUEL SYSTEMS CANADA INC., Vancouver (CA)

(72) Inventors: Ning Wu, Vancouver (CA); Mark E. Dunn, Vancouver (CA)

(73) Assignee: WESTPORT FUEL SYSTEMS CANADA INC., Vancouver (CA)

( * ) Notice: Subject to any disclaimer, the term of this patent is extended or adjusted under 35 U.S.C. 154(b) by 228 days.

(21) Appl. No.: 14/775,555

(22) PCT Filed: Mar. 6, 2014

(86) PCT No.: PCT/CA2014/050185
§ 371 (c)(1),
(2) Date: Sep. 11, 2015

(87) PCT Pub. No.: WO2014/138954
PCT Pub. Date: Sep. 18, 2014

(65) Prior Publication Data
US 2016/0032857 A1 Feb. 4, 2016

(30) Foreign Application Priority Data
Mar. 12, 2013 (CA) ................................ CA 2809298

(51) Int. Cl.
*F02D 41/22* (2006.01)
*F02D 41/30* (2006.01)
(Continued)

(52) U.S. Cl.
CPC ....... *F02D 41/221* (2013.01); *F02D 13/0223* (2013.01); *F02D 13/0234* (2013.01);
(Continued)

(58) Field of Classification Search
CPC ................ F01L 2013/116; F01L 1/267; F02D 2009/0237; F02D 35/025; F02D 35/026;
(Continued)

(56) References Cited

U.S. PATENT DOCUMENTS 5,103,780 A * 4/1992 Ishii .................... F01L 1/34406
123/90.15
5,331,939 A * 7/1994 Trombley ................. F02D 7/02
123/533
(Continued)

FOREIGN PATENT DOCUMENTS

| CN | 101040111 A | 9/2007 |
|---|---|---|
| CN | 101311516 A | 11/2008 |

(Continued)

OTHER PUBLICATIONS

Extended European Search Report, dated Nov. 3, 2016, for European Application No. 14765068.3-1603 / 2971710, 8 pages.
(Continued)

*Primary Examiner* — Logan M Kraft
*Assistant Examiner* — Joshua Campbell
(74) *Attorney, Agent, or Firm* — Seed IP Law Group LLP

(57) ABSTRACT

A technique for fuel system protection for an internal combustion engine comprises determining direct fuel injector temperature as a function of engine operating parameters; and advancing intake valve timing when the temperature rises above a first predetermined value such that the temperature is maintained below a second predetermined value.

30 Claims, 8 Drawing Sheets

(51) Int. Cl.
*F02D 41/00* (2006.01)
*F02D 19/06* (2006.01)
*F02D 13/02* (2006.01)
*F02D 41/14* (2006.01)
*F02D 41/18* (2006.01)

(52) U.S. Cl.
CPC ..... *F02D 19/0623* (2013.01); *F02D 19/0642* (2013.01); *F02D 41/0002* (2013.01); *F02D 41/3094* (2013.01); *F02D 41/0025* (2013.01); *F02D 41/1454* (2013.01); *F02D 41/18* (2013.01); *F02D 2041/001* (2013.01); *F02D 2200/021* (2013.01); *F02D 2200/0414* (2013.01); *F02D 2200/101* (2013.01); *Y02T 10/12* (2013.01); *Y02T 10/30* (2013.01); *Y02T 10/40* (2013.01)

(58) Field of Classification Search
CPC ............. F02D 13/0261; F02D 13/0265; F02D 41/3094
See application file for complete search history.

(56) References Cited

U.S. PATENT DOCUMENTS

| | | | | |
|---|---|---|---|---|
| 5,529,031 | A * | 6/1996 | Yoshioka | F01L 1/34 123/90.15 |
| 7,853,397 | B2 | 12/2010 | Pott et al. | |
| 2002/0066436 | A1* | 6/2002 | Majima | F02D 37/02 123/406.47 |
| 2005/0056260 | A1* | 3/2005 | Ellies | F02D 41/065 123/478 |
| 2006/0075992 | A1* | 4/2006 | Akita | F02M 53/04 123/431 |
| 2006/0213482 | A1* | 9/2006 | Shibagaki | F02D 41/221 123/396 |
| 2007/0006849 | A1* | 1/2007 | Mashiki | F02M 63/029 123/457 |
| 2007/0062179 | A1* | 3/2007 | Leone | F02D 13/0219 60/285 |
| 2007/0107692 | A1 | 5/2007 | Kuo et al. | |
| 2007/0261674 | A1 | 11/2007 | Akita et al. | |
| 2009/0241872 | A1 | 10/2009 | Wang et al. | |
| 2009/0282810 | A1* | 11/2009 | Leone | F02D 19/0692 60/285 |
| 2009/0292443 | A1 | 11/2009 | Stein et al. | |
| 2009/0320788 | A1* | 12/2009 | Ohtsubo | F02D 41/3041 123/295 |
| 2010/0094527 | A1 | 4/2010 | Futonagane et al. | |
| 2011/0146620 | A1* | 6/2011 | Kaneko | F02B 23/105 123/305 |
| 2011/0197853 | A1* | 8/2011 | Takeishi | F02D 13/0261 123/406.45 |
| 2012/0144022 | A1 | 6/2012 | Porter et al. | |
| 2013/0046452 | A1* | 2/2013 | Moscherosch | F02D 41/0025 701/103 |

FOREIGN PATENT DOCUMENTS

| | | | |
|---|---|---|---|
| DE | 10 2007 050 305 A1 | 4/2009 | |
| EP | 0420599 A2 * | 4/1991 | ........... F02D 19/023 |
| EP | 0 826 870 A2 | 3/1998 | |
| EP | 1 344 897 A2 | 9/2003 | |
| GB | 2 367 8 59 A | 4/2002 | |
| JP | 11-351041 A | 12/1999 | |
| JP | 11351041 A * | 12/1999 | ........... F02D 41/0007 |
| JP | 2001-200736 A | 7/2001 | |
| JP | 2001200736 A * | 7/2001 | |
| JP | 2001200736 A * | 7/2001 | |
| JP | 2007040206 A * | 2/2007 | ........... F02D 41/345 |
| WO | 2012/144022 A1 | 10/2012 | |
| WO | 2013/185234 A1 | 12/2013 | |

OTHER PUBLICATIONS

International Search Report dated May 28, 2014, for corresponding International Application No. PCT/CA2014/050185, 3 pages.
Chinese First Office Action, dated Jul. 13, 2017, for Chinese Application No. 201480013497.9, 17 pages. (with English Translation).
Chinese Search Report, dated Jun. 28, 2017, for Chinese Application No. 2014800134979, 5 pages. (with English Translation).
Chinese Office Action, dated Jan. 31, 2019, for Chinese Application No. 201480013497.9, 24 pages (with machine generated English translation).

\* cited by examiner

FUEL INJECTOR TEMPERATURE MITIGATION

FIELD OF THE INVENTION

The present application relates to a technique of fuel system protection for an internal combustion engine, and more particularly to a technique that controls engine valve timing to manage fuel injector temperature.

BACKGROUND OF THE INVENTION

Natural gas is employed as an alternative fuel for vehicles to replace conventional liquid fuels like gasoline and diesel. There are a number of factors motivating the use of natural gas, of which, two are cost and emissions. On an energy equivalent basis natural gas is less expensive than petroleum based fuels. The price of crude oil continues to increase as production continues to outpace discoveries of new oil reserves. In addition, various global political and economic factors can cause volatility in crude oil prices. In contrast, the reserves of natural gas continue to grow with the ongoing discovery of new reserves keeping the price well below oil. Engines fuelled with natural gas produce fewer emissions than engines fuelled with either gasoline or diesel. Ever more stringent emission standards are causing engine manufacturers to consider fuelling vehicles with natural gas to meet such new standards. While the refueling infrastructure for natural gas vehicles is not as extensive as that for conventional liquid fuels, this is a factor that influences adoption of natural gas vehicles especially for consumer automobiles. However, automobile manufacturers are beginning to integrate natural gas fuel systems alongside existing gasoline fuel systems and to adapt internal combustion engines to be fuelled with more than one fuel type, these being referred to in this disclosure as "multi-fuel engines". Work is also underway to replace existing gasoline fuel systems in these engines with natural gas fuel systems such that the engine operates exclusively on natural gas. In this disclosure, the terms "natural gas" and "gas" are used interchangeably and understood to be preferred examples of a gaseous fuel, but that other gaseous fuels such as ethane, methane, propane, biogas, landfill gas, dimethyl ether, hydrogen and mixtures thereof could also be employed instead of natural gas.

In one such multi-fuel engine there is a direct injection fuel system which introduces liquid fuel directly into combustion chambers, and a natural gas port injection fuel system which introduces natural gas into the intake air upstream of intake valves. In this engine liquid fuel remains dormant in direct fuel injectors that are not being actuated when operating in a port injection natural gas fuelled mode. In this mode, because the nozzles of the direct fuel injectors are located in the combustion chamber it is possible that heat from combustion of port injected fuel elevates the temperature of the liquid fuel inside the direct fuel injectors above a threshold temperature such that the injectors are damaged or carbon deposits begin form. The formation of these carbon deposits leads to fouling of the direct fuel injectors impacting the performance of liquid fuel injection.

In another engine system there are both liquid fuel direct and port fuel injection systems. Depending upon the current operating mode the engine can be fuelled with either the direct or port fuel injection system or both in the same operating mode. The liquid fuel that is used to fuel the engine and delivered to the direct and port fuel injection systems can be the same fuel or different fuels if the engine is a multi-fuel engine. For example, when the engine starts it is advantageous to fuel from the direct injection system in a stratified charge mode, and when under high load or speed the engine can fuel from the port injection system in a premixed mode. Direct fuel injectors can become fouled when liquid fuel remains dormant inside while operating the engine with fuel from the port injection system.

U.S. Pat. No. 7,853,397, issued Dec. 14, 2010 to Pott et al. (the '397 patent), discloses a method of operating an internal combustion engine that operates with carburetor fuel, injected through a high pressure direct injector, and with gas fuel introduced into the intake air manifold or ports. In gas operation there is the risk that the high pressure direct injectors heat up due to the lack of through-put of liquid fuel and are subsequently damaged or the fuel located inside forms deposits which have an adverse effect on injector behavior. To avoid these problems, a load characteristic of the high pressure fuel injector is determined and if this load is above a limit value then switchover to carburetor fuel operation is performed, or carburetor fuel operation is hooked into gas operation such that the fuel in the high pressure injector is purged and the injector is cooled. Based on engine temperatures (operating parameters) a thermal load upon the fuel injector is retrieved from a weighing characteristic map, which is integrated over time to determine the load characteristic value. The method of the '397 patent does not determine the temperature of the high pressure injector, but instead determines stored energy representing the empirical thermal load upon the injector. As a result, during gas operation carburetor fuel may be consumed unnecessarily based on the stored energy value even though the temperature of the fuel injector is below a critical value above which deposits begin to form. The method of the '397 patents determines the thermal load upon the high pressure injector during gas operation only, and does not continuously determine the thermal load for all fuelling modes (gas operation, carburetor fuel operation and mixed fuel operation). That is, during gas operation when it is determined that the thermal load is above the limit value, carburetor fuel is flowed through the high pressure fuel injector to purge fuel and cool the injector. The amount of liquid fuel flowed through the injector is based on a predetermined minimum volume, which is expected to cool the injector, instead of the volume required to reduce the temperature of the fuel injector below the critical value at which deposits begin to form. Again, during gas operation, this results in unnecessary and increased carburetor fuel operation.

The state of the art is lacking in techniques for protecting direct injectors in multi-fuel system engines that reduce or minimize the amount of directly injected fuel that is introduced to cool the direct injectors. Accordingly, for engines that can be fuelled through a direct injection system as well as by means of another fuel system there is a need for an improved method of protecting the direct injector when operating with the other fuel system. There is also a need to protect direct injectors that introduce a gaseous fuel from effects resulting from excessively high tip temperatures.

SUMMARY OF THE INVENTION

An improved method of fuel system protection for an internal combustion engine comprises determining a temperature of a direct fuel injector as a function of engine operating parameters; and advancing intake valve timing when the temperature rises above a first predetermined value such that the temperature is maintained below a second predetermined value. The first predetermined value is preferably greater than the second predetermined value. The engine operating parameters comprise at least two of engine speed, air mass flow, engine coolant temperature, equivalence ratio, spark timing, combustion phasing, manifold air temperature, effective EGR rate, intake charge oxygen concentration, trapped oxygen mass, fumigated fuel mass fraction, and directly injected fuel mass fraction. The method can further comprise introducing a directly injected fuel into a combustion chamber through the direct fuel injector; introducing a fumigated fuel upstream of an engine intake valve (referred to in this specification as an intake valve); and selectively operating the internal combustion engine with at least one of the directly injected fuel and the fumigated fuel. Instead of, or in addition to advancing intake valve timing, exhaust valve timing can be retarded as a function of engine operating conditions, such as engine speed, engine load and intake valve timing, whereby the temperature is maintained below the second predetermined value. In addition to advancing intake valve timing, ignition timing can be advanced such that at least one of fuel consumption of the internal combustion engine and turbine inlet temperature is reduced. The directly injected fuel is selected from the group consisting of natural gas, gasoline, ethanol-gasoline blends and diesel. The fumigated fuel is selected from the group consisting of gasoline, ethanol-gasoline blends, ethane, methane, propane, biogas, landfill gas, dimethyl ether, hydrogen and known mixtures thereof. The temperature of the direct fuel injector can comprise a steady state temperature and a transient temperature. The method further comprises determining the steady state temperature of the direct fuel injector as a function of engine operating parameters; and determining the transient temperature of the direct fuel injector as a function of the steady state temperature.

An improved apparatus for fuel system protection in an internal combustion engine comprises a direct fuel injector for introducing a directly injected fuel into a combustion chamber of the internal combustion engine and a controller. The controller is programmed to determine a temperature of the direct fuel injector as a function of engine operating parameters; and to advance intake valve timing when the temperature rises above a first predetermined value such that the temperature is maintained below a second predetermined value. The first predetermined value can be one of greater than the second predetermined value, equal to the second predetermined value and less than the second predetermined value. The apparatus can further comprise a fumigation system for introducing a fumigated fuel upstream of an intake valve of the combustion chamber. The controller can be further programmed to selectively introduce said directly injected fuel through the direct fuel injector and the fumigated fuel through the fumigation system. The controller can still be further programmed to, in addition to or instead of advancing intake valve timing, retard exhaust valve timing as a function of engine operating conditions such that the temperature is maintained below the second predetermined value. The controller can still further be programmed to advance ignition timing such that at least one of fuel consumption of the internal combustion engine and turbine inlet temperature are reduced.

An improved method of fuel system protection for an internal combustion engine comprises both calibration steps and normal operation steps. During calibration of the internal combustion engine, the method comprises determining a temperature of a direct fuel injector as a function of engine operating parameters; and calibrating the engine to advance intake valve timing when the temperature rises above a first predetermined value such that the temperature is maintained below a second predetermined value. During normal operation of the internal combustion engine, the method comprises determining the temperature of the direct fuel injector as a function of engine operating parameters; and performing a temperature mitigation technique when the temperature rises above a third predetermined value such that the temperature is maintained below a fourth predetermined value. The temperature mitigation technique can comprise at least one of the techniques described in this specification (advancing intake valve timing and retarding exhaust valve timing) and flowing directly injected fuel through the direct fuel injector. The third temperature can be less than the first temperature, and the fourth temperature can be less than the second temperature.

DETAILED DESCRIPTION OF PREFERRED EMBODIMENT(S)

Figure 1:
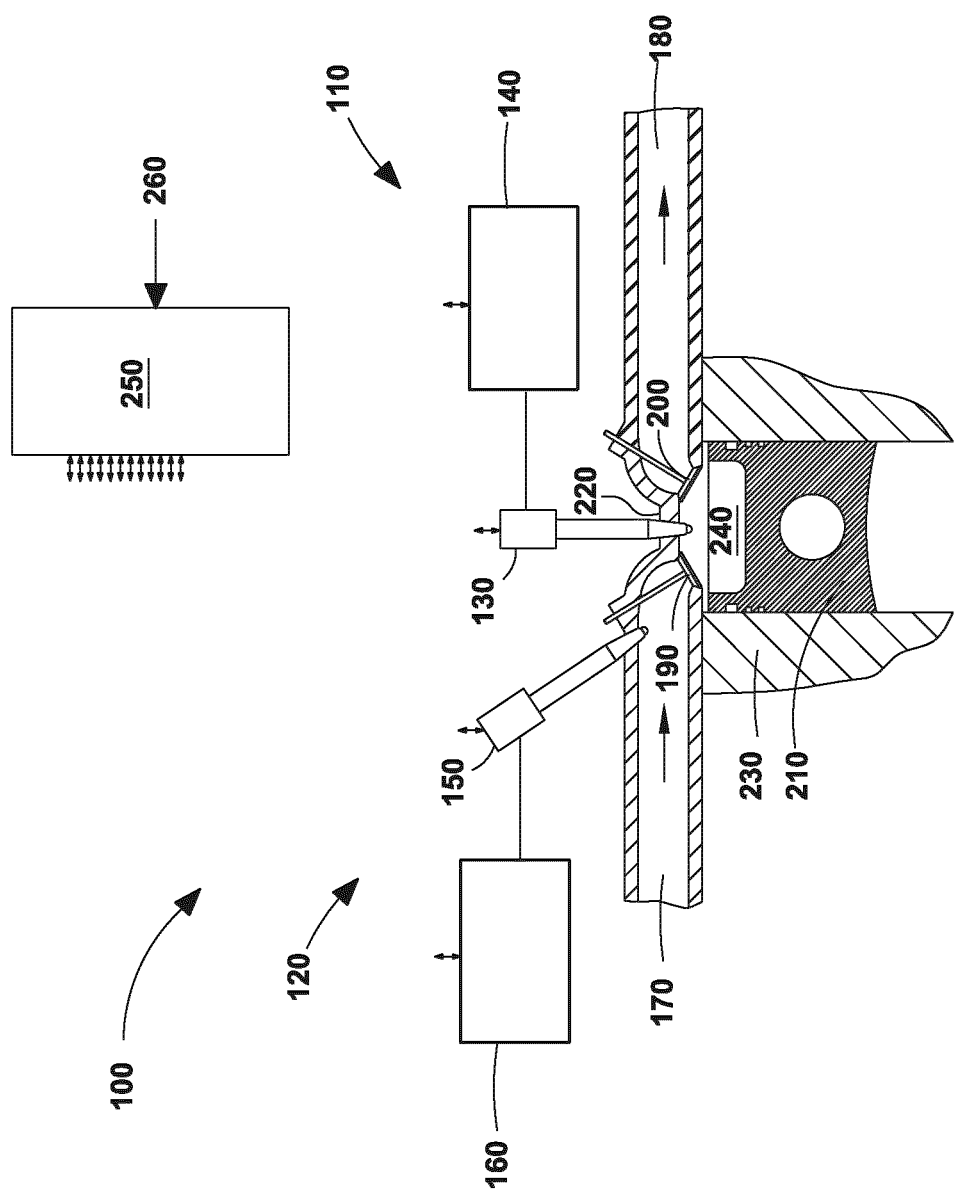
FIG. 1 is a schematic view of an internal combustion engine according to one embodiment.

Referring to the schematic view of FIG. 1, there is shown an internal combustion engine 100 comprising a direct injection system 110 and a fumigated system 120. Direct injection system 110 comprises at least one direct fuel injector 130 and fuel supply system 140. While direct fuel injector 130 is shown centrally located in cylinder head 220, in other embodiments (not shown) a direct fuel injector can be mounted in other locations, for example in the cylinder head, but off-center, or side-mounted in a wall of cylinder 230. Although only one cylinder 230 is illustrated, in typical embodiments there is a plurality of cylinders, and for each individual cylinder there is a respective direct fuel injector. Fuel supply system 140 supplies fuel to injector 130 and comprises known components found in direct injection systems which can vary depending upon whether the directly injected fuel is a liquid fuel or a gaseous fuel. A gaseous fuel is defined as any fuel that is in a gaseous phase at standard temperature and pressure. Fumigated system 120 comprises known components to introduce fuel upstream of intake valve 190. In the illustration of FIG. 1, fumigated system 120 comprises at least one port fuel injector 150 and fuel supply system 160. In embodiments where there is more than one cylinder, there can be one port fuel injector for each cylinder, or one fuel injector located further upstream in intake manifold 170 can provide fuel for more than one cylinder. Fuel supply system 160 supplies fuel to injector 150 and comprises known components found in fumigated systems which are selected in accordance with whether the fumigated fuel is a liquid fuel or a gaseous fuel. Engine 100 further comprises exhaust manifold 180. For each cylinder there is an intake valve 190 and an exhaust valve 200. Piston 210 travels within the walls of cylinder 230. Combustion chamber 240 is formed by the space enclosed by the walls of cylinder 230, piston 210 and cylinder head 220. Engine 100 further comprises means for igniting the fuel such as temperature and pressure generated by compression, a spark plug, a glow plug, or other known ignition means (not shown). In a preferred embodiment engine 100 is spark ignited. In other embodiments other conventional ignition sources can be employed depending upon system requirements. Electronic controller 250 communicates with and commands both direct injection system 110 and fumigated system 120 to deliver fuel for combustion in engine 100. Signal wires represented by the symbols with double arrow heads such as those on the left side of electronic controller 250, transmit measured parameters to controller 250 from sensors and send command signals for controlling the operation of individual components. Electronic controller 250 can comprise both hardware and software components. The hardware components can comprise digital and/or analog electronic components. In the present example electronic controller 250 comprises a processor and memories, including one or more permanent memories, such as FLASH, EEPROM and a hard disk, and a temporary memory, such as SRAM and DRAM, for storing and executing a program. In another preferred embodiment electronic controller 250 is an engine control unit (ECU) for engine 100. As used herein, controller 250 is also referred to as 'the controller'. As used herein, the terms algorithm, module and step refer to an application specific integrated circuit (ASIC), an electronic circuit, a processor (shared, dedicated, or group) and memory that execute one or more software or firmware programs, a combinational logic circuit, and/or other suitable components that provide the described functionality. In preferred embodiments the algorithms, modules and steps herein are part of electronic controller 250.

Engine 100 can operate in multiple fuelling modes comprising a direct injection mode, a fumigated mode and a co-fuelling mode. In the direct injection mode, fuel for combustion in engine 100 is primarily provided by direct injection system 110. In the fumigated mode fuel for combustion in engine 100 is primarily provided by fumigated system 120, however depending upon engine operating conditions it is possible that fuel is also provided by direct injection system 120 for the purpose of cooling direct fuel injectors 130. In the co-fuelling mode, fuel for combustion is simultaneously provided by both direct injection system 110 and fumigated system 120. It is possible that engine 100 operates in a manner that it can selectively switch between these modes on a per cycle basis. Injection timing can be predetermined responsive to engine operating conditions determined from measured parameters that are inputted into electronic controller 250, and the input of such parameters among others is represented by arrow 260.

Figure 2:
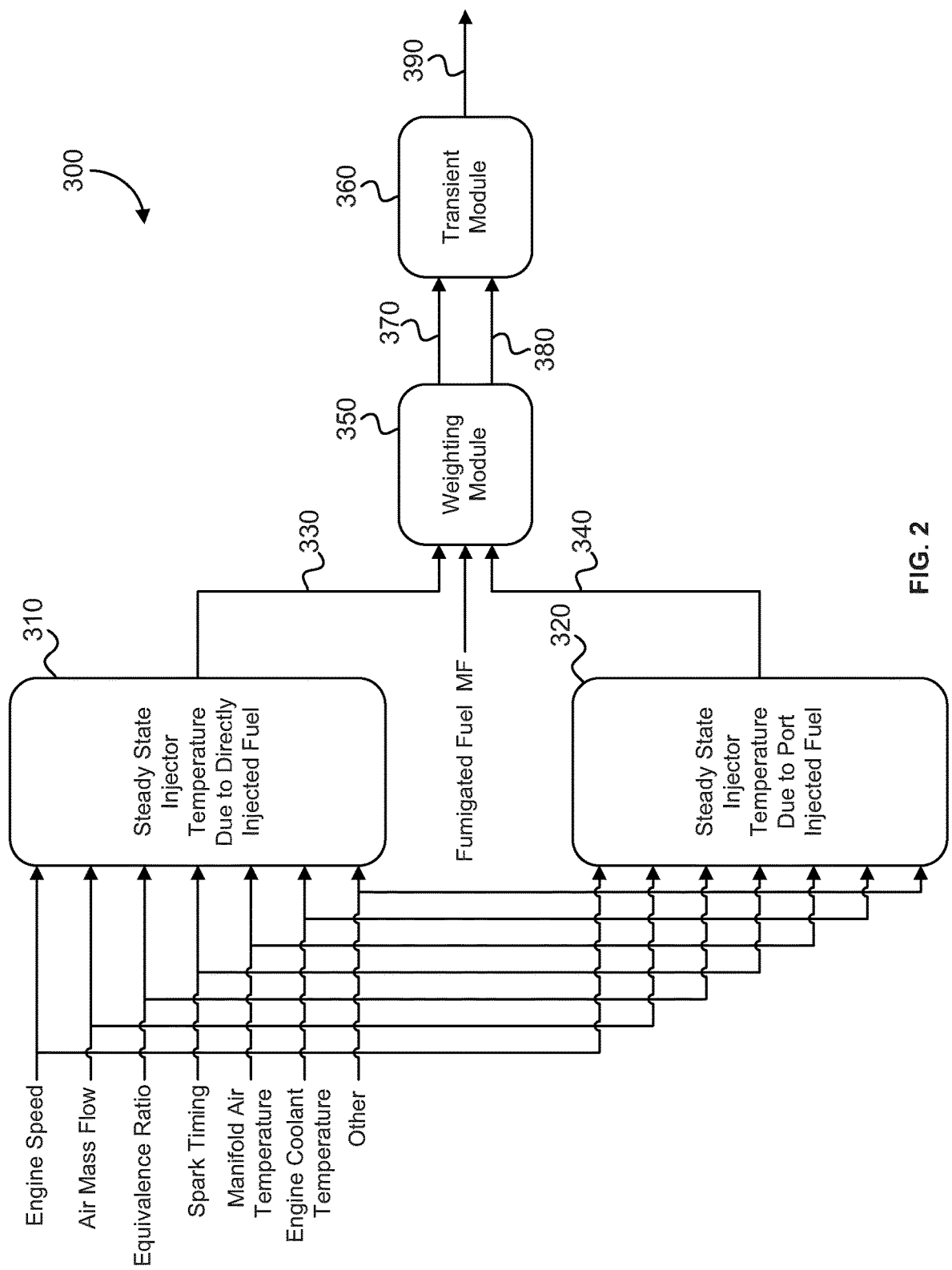
FIG. 2 is a block diagram of a fuel injector temperature determination module according to one embodiment of the internal combustion engine of FIG. 1.

Referring now to FIG. 2 there is shown a fuel injector temperature determination module 300 that estimates the temperature of direct fuel injector 130 during each of the fuelling modes of engine 100. Determination module 300 is similar to that described in the Applicant's co-pending U.S. Provisional Patent Application No. 61/659,704, filed Jun. 14, 2012, which is incorporated by reference herein in its entirety. In a preferred embodiment temperature module 300 is an algorithm performed by electronic controller 250 that in response to engine operating parameters estimates the temperature of a tip of direct fuel injector 130 on a continuous and real-time basis. The fuel system protection technique disclosed herein makes use of the injector temperature estimated by temperature module 300 to reduce short and long term damage of direct fuel injector 130, and to reduce the risk of and preferably prevent failure modes of injector 130. There are several failure modes of injector 130 due to overheating comprising carbon deposit formation and general fouling, seal damage and valve seat damage. The engine operating parameters employed by temperature module 300 comprise at least fuelling quantity and fuelling frequency, or at least one parameter representative of the quantity of fuel introduced into combustion chamber 240 and one parameter representative of the frequency with which that quantity of fuel is introduced. Other parameters that influence in-cylinder temperature can also be among the engine operating parameters employed by temperature module 300. For example, the engine operating parameters employed by temperature module 300 can be selected from engine speed, air mass flow, equivalence ratio, spark timing, combustion phasing, manifold air temperature, engine coolant temperature, effective EGR rate (for internal and external EGR), intake charge oxygen concentration, trapped oxygen mass, fuel mass flow, commanded torque, air per cycle, fumigated fuel mass fraction, directly injected fuel mass fraction and other engine operating parameters. Fumigated fuel mass fraction is defined as the mass of fumigated fuel consumed by engine 100 divided by the total mass of fuel (fumigated fuel and directly injected fuel) consumed by engine 100. Directly injected fuel mass fraction is defined as the mass of directly injected fuel consumed by engine 100 divided by the total mass of fuel (fumigated fuel and directly injected fuel) consumed by engine 100. It has been determined that these parameters allow a representative estimation of the temperature of direct fuel injector 130 over the range of engine operating conditions. An advantage of the present technique over previous techniques is the reduction and preferably minimization of directly injected fuel consumption while operating in the fumigated mode and the co-fuelling mode. Temperature module 300 comprises direct temperature module 310 and fumigated temperature module 320. Direct temperature module 310 comprises a steady state temperature model for estimating the temperature of direct fuel injector 130 due to combustion of fuel introduced to combustion chamber 240 through direct fuel injector 130. When engine 100 operates exclusively in direct injection mode then module 310 alone estimates the temperature of direct fuel injector 130 for given steady state engine operating parameters. The term "steady state" as used herein is defined as the engine operating conditions that result when engine operating parameters remain at respective values within predetermined ranges. The direct temperature model in module 310 can be determined empirically and can be in the form of a look-up table and/or a mathematical formula which are responsive to the engine operating parameters to provide temperature signal 330 representing the temperature of direct fuel injector 130 due to combustion of directly injected fuel. Direct temperature module 310 outputs signal 330 on a continuous basis for all operating modes of engine 100. Fumigated temperature module 320 comprises a steady state temperature model for estimating the temperature of direct fuel injector 130 due to combustion of fuel introduced upstream of intake valve 190, for example through port fuel injector 150. When engine 100 operates exclusively in fumigated mode then module 320 alone estimates the temperature of direct fuel injector 130 for given steady state engine operating parameters. The fumigated temperature model in module 320 can be determined empirically and can be in the form of a look-up table and/or a mathematical formula which are responsive to the engine operating parameters to provide temperature signal 340 representing the temperature of direct fuel injector 130 due to combustion of fumigated fuel. Fumigated temperature module 320 outputs signal 340 on a continuous basis for all operating modes of engine 100.

Temperature module 300 further comprises weighting module 350 and transient module 360. Weighting module 350 determines the temperature of direct fuel injector 130 when engine 100 operates from both directly injected and fumigated fuels. In the steady state when operating from both fuels weighting module 350 determines temperature signal 370 as a function of temperature signals 330 and 340 and one of the fumigated fuel mass fraction and the directly injected fuel mass fraction. A weighting function employed by module 330 can be determined empirically and can be in the form of a look-up table and/or a mathematical formula. For example, a 1D look-up table storing a delta multiplier (DM) can be indexed by the fumigated fuel mass fraction to retrieve the delta multiplier employed by Eqn. 1 below to determine temperature signal 370. In Eqn. 1, $TS_{370}$ represents temperature signal 370, $TS_{340}$ represents temperature signal 340 and $TS_{330}$ represents temperature signal 330.

$$TS_{370}=TS_{340}+(TS_{340}-TS_{330})*DM \qquad \text{Eqn. 1}$$

Transient module 360 determines the temperature of direct fuel injector 130 during transient engine operating conditions, for example after the engine operating parameters change and before the injector temperature has reached a steady state value. When one or more engine operating parameters change, temperature modules 310 and 320 determine the steady state temperature immediately based on the new engine operating parameters. However, the temperature of direct fuel injector 130 does not change immediately when engine operating parameters change due to its thermal impedance and the thermal impedance of engine 100, but rather changes gradually over time. Transient module 360 determines injector temperature signal 390 (also called the transient temperature or the final estimated temperature of injector 130) as a function of injector temperature signal 370, time constant signal 380 and a history of past determinations of injector temperature signal 390. Time constant signal 380 is representative of a thermal characteristic of direct injector 130 and engine 100 and is determined in weighting module 350 in the present embodiment as a function of the fumigated fuel mass fraction or alternatively the directly injected fuel mass fraction. A 1D look-up table storing time constant signal 380 can be indexed by the fumigated fuel mass fraction to retrieve signal 380. Module 360 applies a time constant formula against changes in temperature signal 370, which reflect changing engine parameters, to estimate the gradual change in injector temperature signal 390. One such time constant formula comprises a running average function according to Eqn. 2 below. In Eqn. 2, $TS_{390,current}$ represents the existing value of temperature signal 390 which is representative of the history of signal 390, $TS_{390,new}$ represents the next value of temperature signal 390 according to the running average function, $TS_{370}$ represents temperature signal 370 and $TC_{380}$ represents time constant signal 380.

$$TS_{390,new}=TS_{390,current}*(1-TC_{380})+(TS_{370})*TC_{380} \qquad \text{Eqn. 2}$$

Figure 3:
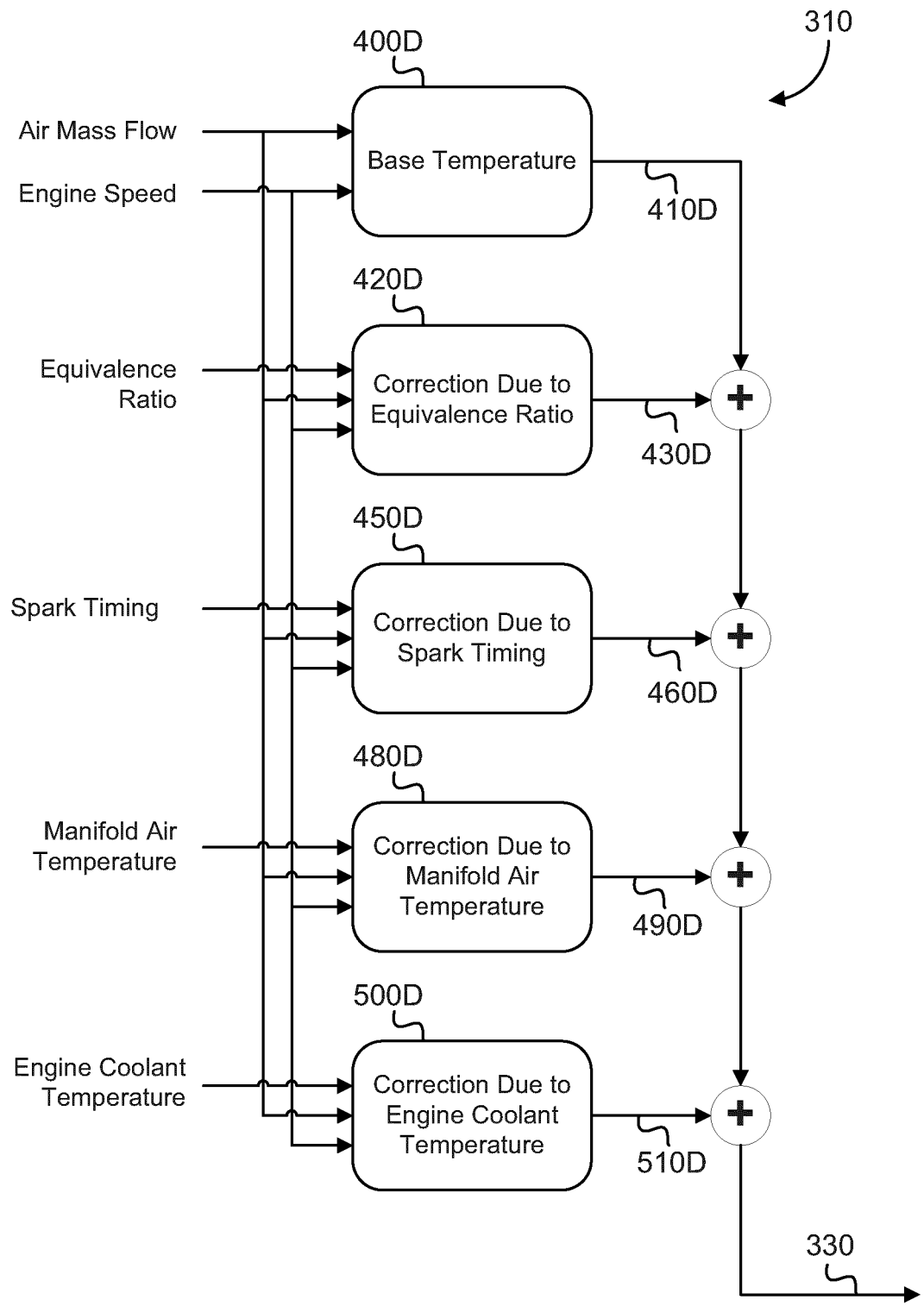
FIG. 3 is a block diagram of a steady state temperature module for the fuel injector temperature determination module of FIG. 2 according to one embodiment when the internal combustion engine of FIG. 1 operates with directly injected fuel.

Referring now to FIG. 3, direct temperature module 310 is illustrated according to another embodiment. In the embodiment of FIG. 2, module 310 determines temperature signal 330 as a function of engine operating parameters. In the embodiment of FIG. 3, module 310 employs one or more look-up tables and/or formulas to determine signal 330. Steady state base temperature module 400D determines base temperature signal 410D. In an engine operating near stoichiometry, base temperature can be determined from air mass flow and engine speed, which are representative of the quantity of fuel introduced into combustion chamber 240 and of the frequency with which that quantity of fuel is introduced. In other embodiments (not illustrated) base temperature can be determined from other engine operating parameters which are representative of the quantity of fuel introduced into combustion chamber 240 and of the frequency with which that quantity of fuel is introduced. For example, in a Diesel-cycle engine fuel mass flow and engine speed can be employed. Base temperature signal 410D represents the steady state injector temperature due to combustion of directly injected fuel. Correction module 420D determines connection signal 430D as a function of parameters known to influence in-cylinder temperature. By way of example as shown in FIG. 3 in an Otto-cycle engine the equivalence ratio, air mass flow and engine speed are parameters that can be used to determine a correction signal for an Otto-cycle engine. Instead of equivalence ratio other determinative parameters can be employed such as excess air ratio. Correction module 450D determines correction signal 460D as a function of ignition timing. For an Otto-cycle engine as shown in FIG. 3 spark timing, air mass flow and engine speed are parameters that can influence ignition timing and temperature signal 330. Instead of spark timing other parameters determinative of ignition timing can be employed such as combustion phasing which could be employed in a non-spark ignited engine. Correction module 480D determines correction signal 490D as a function of manifold air temperature, air mass flow and engine speed and represents the variation in base temperature signal 410D due to manifold air temperature. Correction module 500D determines correction signal 510D as a function of engine coolant temperature, air mass flow and engine speed and represents the variation of base temperature signal 410D due to engine coolant temperature. For each of the modules 420D, 450D, 480D and 500D, engine operating parameters alternative to air mass flow and engine speed can be employed. Temperature signal 330 is generated by adding together signals 410D, 430D, 460D, 490D and 510D. The controller can selectively and independently disable the corrections performed by each of the correction modules 420D, 450D, 480D and 500D by setting respective correction signals 430D, 460D, 490D and 510D to zero (0). For example, if an engine sensor is damaged and the corresponding measured parameter is not reliable then the related correction can be disabled.

Figure 4:
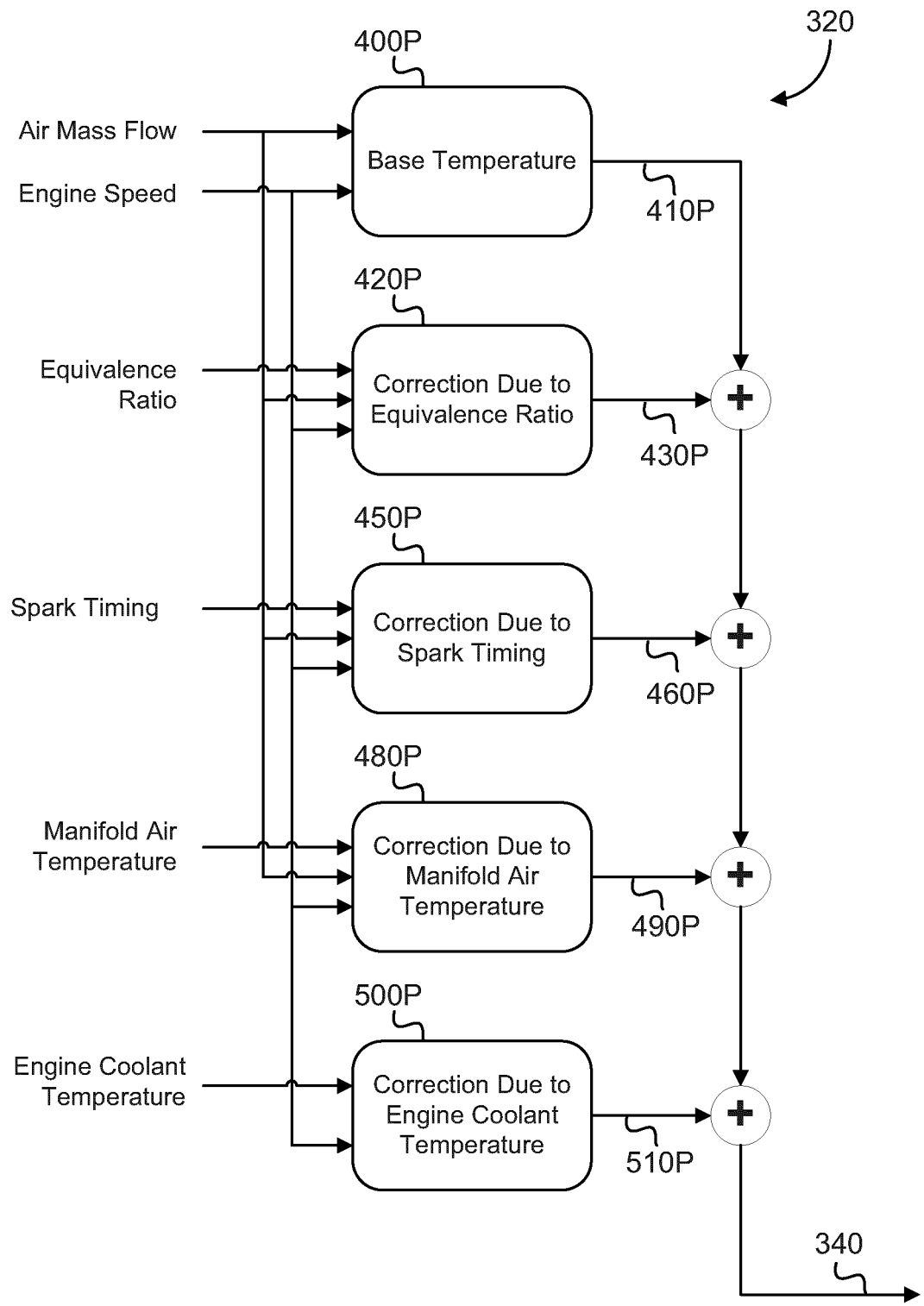
FIG. 4 is a block diagram of a steady state temperature module for the fuel injector temperature determination module of FIG. 2 according to one embodiment when the internal combustion engine of FIG. 1 operates with port injected fuel.

Referring now to FIG. 4, fumigated temperature module 320 is illustrated according to another embodiment. In the embodiment of FIG. 2, module 320 determines temperature signal 340 as a function of engine operating parameters. In the embodiment of FIG. 4, module 320 employs one or more look-up tables and/or formulas to determine signal 340. Steady state base temperature module 400P determines base temperature signal. In an engine operating near stoichiometry, base temperature can be determined from air mass flow and engine speed, which are representative of the quantity of fuel introduced into combustion chamber 240 and of the frequency with which that quantity of fuel is introduced. In other embodiments (not illustrated) base temperature can be determined from other engine parameters which are representative of the quantity of fuel introduced into combustion chamber 240 and of the frequency with which that quantity of fuel is introduced. For example, in a Diesel-cycle engine fuel mass flow and engine speed can be employed. Base temperature signal 410P represents the steady state injector temperature due to combustion of fumigated fuel. Correction module 420P determines correction signal 430P as a function of parameters known to influence in-cylinder temperature. By way of example as shown in FIG. 4 in an Otto-cycle engine the equivalence ratio, air mass flow and engine speed are parameters that can be used to determine a correction signal for an Otto-cycle engine. Instead of equivalence ratio other determinative parameters can be employed such as excess air ratio. Correction module 450P determines correction signal 460P as a function of ignition timing For an Otto-cycle engine as shown in FIG. 4 spark timing, air mass flow and engine speed are parameters that can influence ignition timing and temperature signal 340. Instead of spark timing other parameters determinative of ignition timing can be employed such as combustion phasing which could be employed in a non-spark ignited engine. Correction module 480P determines correction signal 490P as a function of manifold air temperature, air mass flow and engine speed and represents the variation in base temperature signal 410P due to manifold air temperature. Correction module 500P determines correction signal 510P as a function of engine coolant temperature, air mass flow and engine speed and represents the variation of base temperature signal 410P due to engine coolant temperature. For each of the modules 420P, 450P, 480P and 500P, engine operating parameters alternative to air mass flow and engine speed can be employed. Temperature signal 340 is generated by adding together signals 410P, 430P, 460P, 490P and 510P. The controller can selectively and independently disable the corrections performed by each of the correction modules 420P, 450P, 480P and 500P by setting respective correction signals 430P, 460P, 490P and 500P to zero (0). For example, if an engine sensor is damaged and the corresponding measured parameter is not reliable then the related correction can be disabled.

Figure 5:
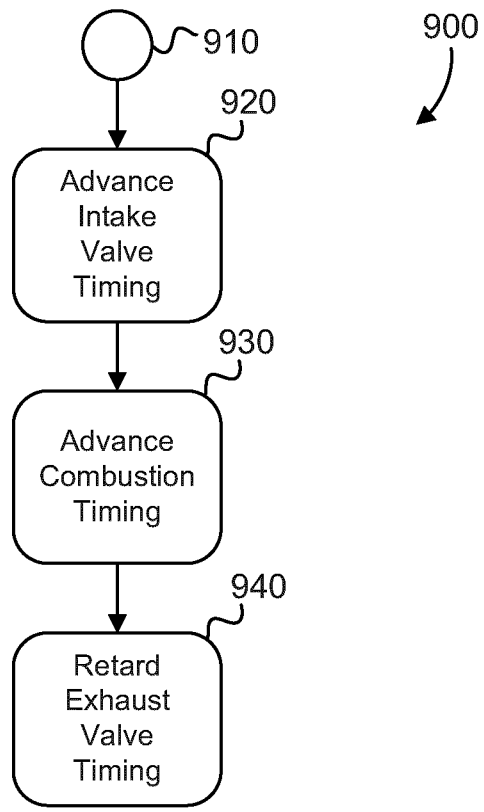
FIG. 5 is a flow chart diagram of a fuel system protection algorithm according to a first embodiment for the internal combustion engine of FIG. 1.
Figure 6:
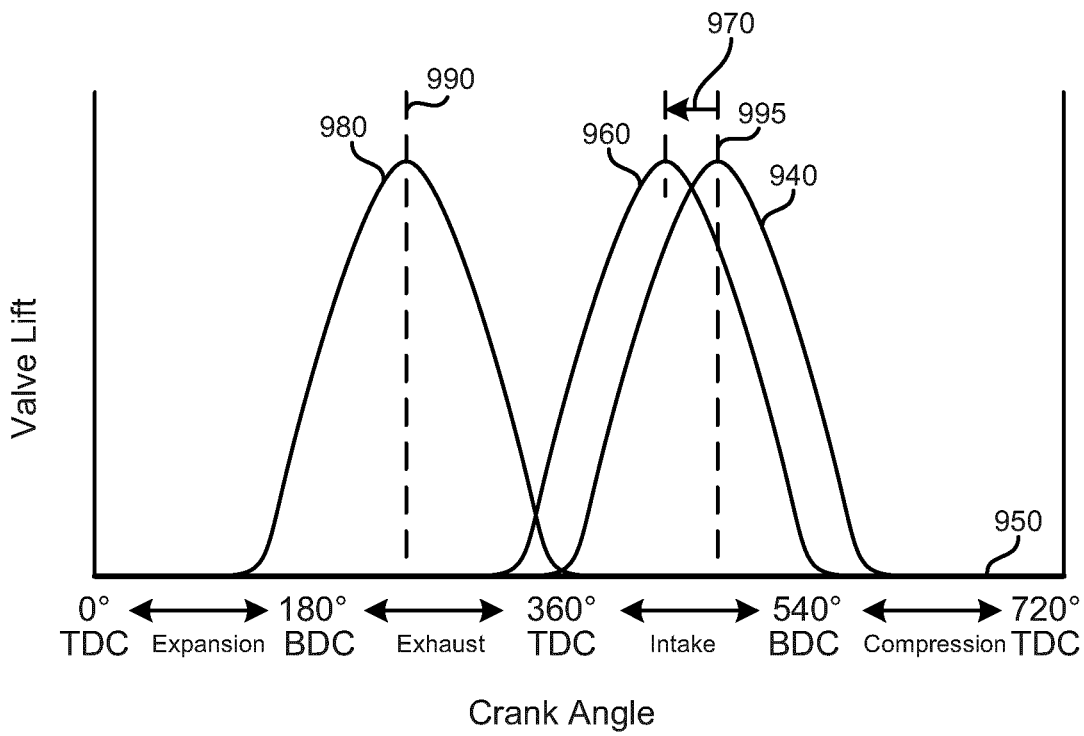
FIG. 6 is a plot of intake valve lift for normal and advanced timing and exhaust valve lift versus crank angle for the fuel system protection algorithm of FIG. 5.

Referring now to FIG. 5 a fuel system protection algorithm 900 that reduces and preferably prevents short term and long term damage to direct fuel injector 130 is shown according to a first embodiment. Algorithm 900 is entered when it is determined that injector temperature signal 390 is above a first predetermined value in step 910. In step 920 intake valve timing is advanced such that intake valve 190 opens earlier by a predetermined amount and held at such advanced timing at least until temperature signal 390 is reduced below a second predetermined value. In a preferred embodiment the second predetermined value is less than the first predetermined value such that hysteresis is introduced to reduce the likelihood of cycling in and out of algorithm 900. FIG. 6 illustrates normal intake valve lift profile 940 as a function of crank angle along axis 950, and advanced intake valve lift profile 960 commanded by step 920. By opening intake valve 190 early, normal intake valve lift profile 940 is shifted by predetermined crank angle amount 970. In conventional engines, the opening of the intake valve typically occurs at approximately 10 degrees before top dead center (TDC). Early opening of intake valve 190 well before the end of the exhaust stroke increases the duration of overlap between opened intake valve 190 and exhaust valve 200. As seen in FIG. 6, advanced intake valve lift profile 960 overlaps exhaust valve lift profile 980 near the end of the exhaust stroke. Due to this overlap, some exhaust gas goes back into the intake manifold as a result of a cylinder-intake manifold pressure gradient, and then re-enters combustion chamber 240 with the new air-fuel mixture. Trapping exhaust gas in combustion chamber 240 acts to reduce combustion temperature and consequently injector temperature signal 390. By advancing intake valve timing the effective compression ratio increases, since the closing of the intake valve happens sooner after bottom dead center compared to normal intake valve timing. Consequently, the compression process begins earlier such that with fixed ignition timing (spark timing) it effectively means retarding combustion (as can be seen in the retarding of CA50 in FIG. 8 that is described in more detail below).

Figure 7:
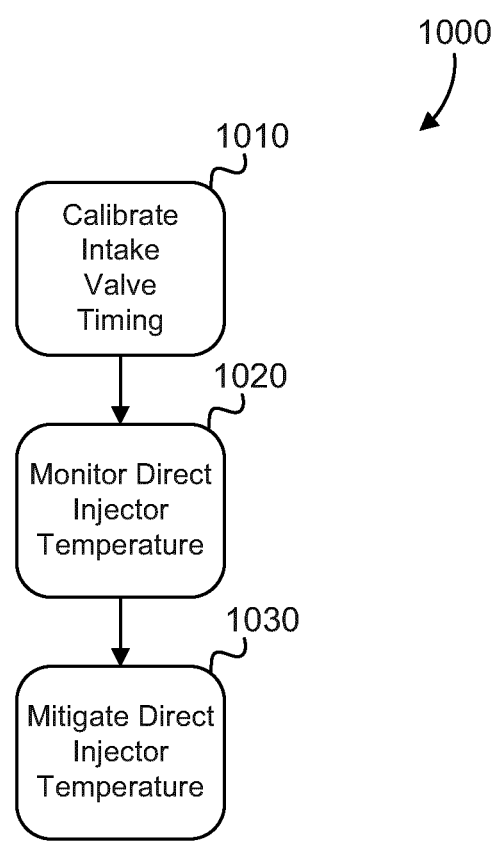
FIG. 7 is flow chart diagram of a fuel system protection algorithm according to a second embodiment for the internal combustion engine of FIG. 1.

Referring now to FIG. 7 a fuel system protection algorithm 1000 that reduces and preferably prevents short term and long term damage to direct fuel injector 130 is shown according to a second embodiment. Engine 100 is calibrated for operation during step 1010, during which the technique of advancing intake valve timing can be employed to reduce the temperature of direct fuel injector 130 at various engine operating conditions. For those engine operating conditions during engine calibration where the temperature of direct fuel injectors rises above the first predetermined value, the engine can be calibrated to advanced intake valve timing to reduce the temperature below the second predetermined value. The engine operating conditions are at least for steady state conditions and can include transient conditions (especially those that are known to occur). Steps 1020 and 1030 are commanded during normal operation of engine 100 when the engine runs as calibrated in step 1010. The temperature of direct fuel injector 130 is monitored in step 1020 and when the temperature rises above a third predetermined value step 1030 is commanded where a temperature mitigation technique is employed to reduce the temperature below a fourth predetermined value. The temperature mitigation technique can those techniques described in algorithm 900. Alternatively, or additionally, directly injected fuel can be flowed through direct fuel injector 130 to cool the injector and reduce its temperature. Other known temperature mitigation techniques can be employed. The first and third predetermined values, as well as the second and fourth predetermined values, can be the same quantities or different. For example the third predetermine value can be less than the first predetermined value, and the fourth predetermined value can be the less than the third predetermined value.

Alternatively, during engine calibration the engine can be calibrated to advance intake valve timing for certain engine operating conditions to reduce the temperature of direct fuel injector 130, and during normal engine operation temperature module 300 can be employed to determine when temperature signal 390 rises above the first predetermined value such that additional mitigation techniques can be employed to maintain temperature signal 390 below the second predetermined value. Such additional mitigation techniques comprise advancing intake valve timing further or flowing directly injected fuel through direct fuel injector 130.

Experimental tests were designed and carried out to quantify the performance of advancing intake valve timing in reducing injector temperature signal 390 (the tip temperature), and the results of these tests are illustrated in FIGS. 8-11. In the legend on the right hand side of each of these figures the first number represents exhaust cam phaser position (exhaust valve timing), and the second number represents intake cam phaser position (intake valve timing) A positive value is interpreted as retarding timing for exhaust cam phaser position away from exhaust cam centerline 990 towards 720° crank angle, and advancing timing for intake cam phaser position away from intake cam centerline 995 towards 0° crank angle. For example, in FIG. 8 the base calibration '10-8' refers to exhaust valve timing of 10° retarded from the exhaust cam centerline (exhaust valve closes later), and intake valve timing of 8° advanced from the intake cam centerline (intake valve opens earlier). In each of FIGS. 8-11, exhaust valve timing is fixed at 10°.

Figure 8:
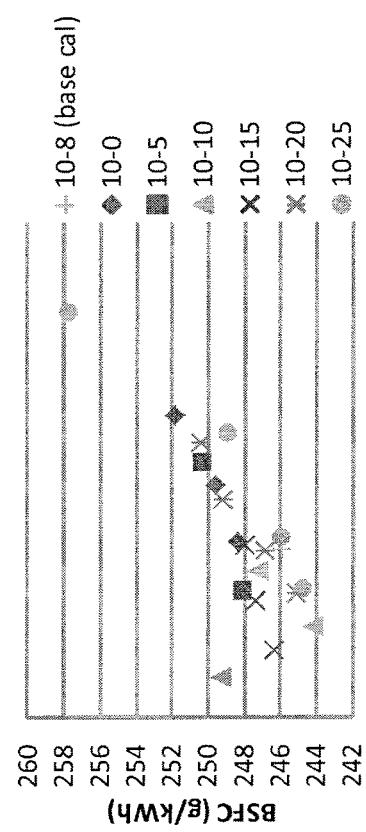
FIG. 8 is a plot of injector tip temperature versus crank angle in degrees after top dead center (ATDC) in which the integrated heat release curve reaches its 50% value (CA50) for the internal combustion engine of FIG. 1 operated with a fixed exhaust valve timing of 10° retarded from an exhaust cam centerline, and where intake valve timing is advanced 0° (10-0), 5° (10-5), 8° (10-8), 10° (10-10), 15° (10-15), 20° (10-20) and 25° (10-25) from an intake cam centerline. The baseline engine operation is the (10-8) test case. Retarding from the exhaust cam centerline means closing the exhaust valve later, and advancing from an intake cam centerline means opening the intake valve earlier.

Referring to FIG. 8, for fixed exhaust valve timing and combustion timing, as intake valve timing is advanced injector temperature signal 390, which can be measured by a thermocouple instrumented in the injector tip, drops. Compared to the base engine calibration ('10-8'), advancing intake valve timing from 8 to 15 degrees before TDC reduced injector tip temperature by approximately 50 degrees Celsius for the calibration engine, although results can vary for different engines.

Figure 9:
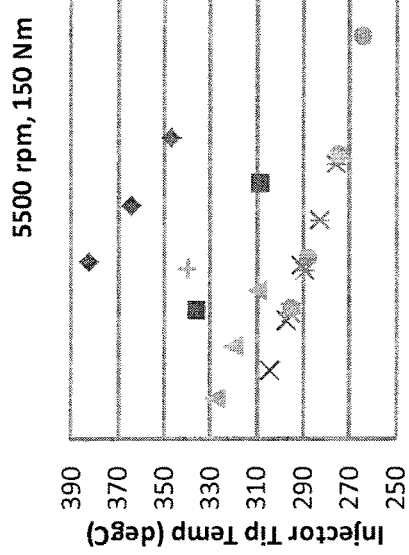
FIG. 9 is a plot of brake specific fuel consumption (BSFC) versus crank angle in degrees after top dead center (ATDC) in which the integrated heat release curve reaches its 50% value (CA50) for the internal combustion engine of FIG. 1 operated with a fixed exhaust valve timing of 10° retarded from an exhaust cam centerline, and where intake valve timing is advanced 0° (10-0), 5° (10-5), 8° (10-8), 10° (10-10), 15° (10-15), 20° (10-20) and 25° (10-25) from an intake cam centerline. The baseline engine operation is the (10-8) test case. Retarding from the exhaust cam centerline means closing the exhaust valve later, and advancing from an intake cam centerline means opening the intake valve earlier.

Advancing intake valve timing resulted in higher fuel consumption when the combustion timing is fixed. However, by advancing combustion timing by ignition timing adjustment (advancing spark timing) similar or even lower brake specific fuel consumption (BSFC) can be achieved compared to the base case ('10-8') while still maintaining a lower injector tip temperature. This is illustrated in FIG. 9 where BSFC is reduced as the integrated heat release 50% value (CA50), which is an indication of combustion timing, is reached earlier. Referring again to FIG. 5, combustion timing is advanced in step 930 by advancing ignition timing thereby improving brake specific fuel consumption.

Figure 10:
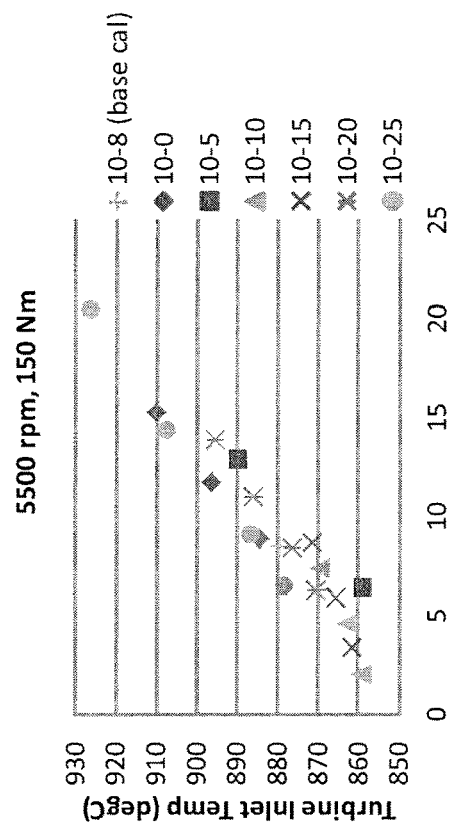
FIG. 10 is a plot of coefficient of variation of gross indicated mean effective pressure (COV of GIMEP) versus crank angle in degrees after top dead center (ATDC) in which the integrated heat release curve reaches its 50% value (CA50) for the internal combustion engine of FIG. 1 operated with a fixed exhaust valve timing of 10° retarded from an exhaust cam centerline, and where intake valve timing is advanced 0° (10-0), 5° (10-5), 8° (10-8), 10° (10-10), 15° (10-15), 20° (10-20) and 25° (10-25) from an intake cam centerline. The baseline engine operation is the (10-8) test case. Retarding from the exhaust cam centerline means closing the exhaust valve later, and advancing from an intake cam centerline means opening the intake valve earlier.
Figure 11:
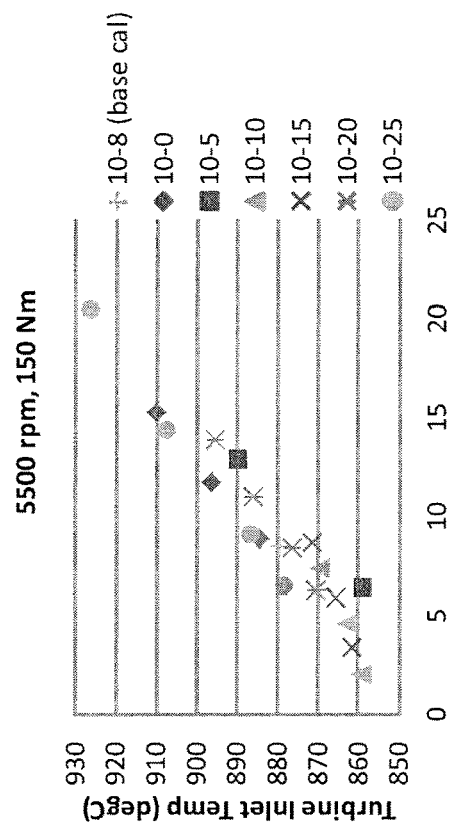
FIG. 11 is a plot of turbine inlet temperature versus crank angle in degrees after top dead center (ATDC) in which the integrated heat release curve reaches its 50% value (CA50) for the internal combustion engine of FIG. 1 operated with a fixed exhaust valve timing of 10° retarded from an exhaust cam centerline, and where intake valve timing is advanced 0° (10-0), 5° (10-5), 8° (10-8), 10° (10-10), 15° (10-15), 20° (10-20) and 25° (10-25) from an intake cam centerline. The baseline engine operation is the (10-8) test case. Retarding from the exhaust cam centerline means closing the exhaust valve later, and advancing from an intake cam centerline means opening the intake valve earlier.

Combustion stability is not significantly affected when intake valve timing and spark timing are advanced in the tested ranges. Referring to FIG. 10, the coefficient of variation of gross indicated mean effective pressure (an indication of combustion stability) is within a predetermined range as intake valve timing is advanced. When intake valve and exhaust valve overlap increases beyond a predetermined number of crank angles, turbine inlet temperature rises with increased rate, as illustrated by the '10-25' test case in FIG. 11, and for each engine there will be a determined limit on the amount the intake valve opening can be advanced with undue adverse effects.

The tests for quantifying the influence of intake valve timing on injector tip temperature also included testing the influence of exhaust valve timing. It was discovered there is an influence, but its effect on injector temperature is not as significant as advancing intake valve timing. Under certain engine operating conditions, determined as a function of engine speed, torque (load) and intake valve timing, reductions in injector tip temperature were observed by modifying exhaust valve timing. The relationship between injector tip temperature and exhaust valve timing was observed to be non-linear. For example, for a given engine speed, torque (load) and intake valve timing, as exhaust valve timing was retarded (closed later) injector tip temperature decreased, as exhaust valve timing was further retarded injector tip temperature increased, and as exhaust valve timing was even further retarded injector tip temperature again decreased.

Figures 12, 13:
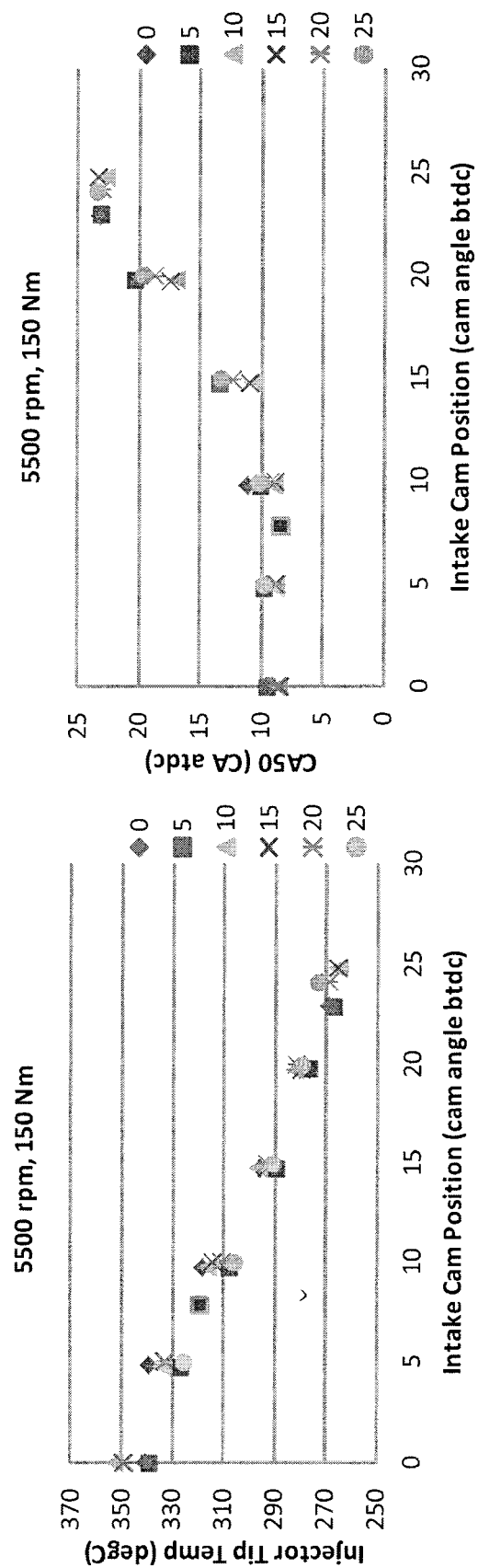
FIG. 12 is a plot of injector tip temperature versus intake cam position timing for the internal combustion engine of FIG. 1, and for each intake cam position the engine is operated with exhaust valve timing retarded 0°, 5°, 8°, 10°, 15°, 20° and 25° from an exhaust cam centerline. Retarding from the exhaust cam centerline means closing the exhaust valve later, and advancing from an intake cam centerline means opening the intake valve earlier.
FIG. 13 is a plot of the integrated heat release curve 50% value (CA50) versus intake cam position timing for the internal combustion engine of FIG. 1, and for each intake cam position the engine is operated with exhaust valve timing retarded 0°, 5°, 8°, 10°, 15°, 20° and 25° from an exhaust cam centerline. Retarding from the exhaust cam centerline means closing the exhaust valve later, and advancing from an intake cam centerline means opening the intake valve earlier.

This is illustrated in FIGS. 12 and 13, which illustrates engine 100 operating in fumigated mode at 5500 rpm and with a load of 150 Nm. The numbers in the legends on the right hand side of FIGS. 12 and 13 represent exhaust cam phaser position (exhaust valve timing). With the intake valve timing (intake cam position) fixed at 5° before TDC, and combustion timing (CA50) relatively constant within a range of tolerance as seen in FIG. 13, it was observed and illustrated in FIG. 12 that the tip temperature of direct fuel injector 130 is approximately 340° C. at exhaust valve timing of 0° after TDC. As the exhaust valve timing was retarded to 5° after TDC the tip temperature decreased to approximately 325° C.; as the exhaust valve timing was retarded further to 10° after TDC the tip temperature increased to approximately 335° C.; and as the exhaust valve timing was further retarded to 25° after TDC the tip temperature decreased to approximately 325° C. Referring again to FIG. 5, step 940 can be employed in certain circumstances to reduce injector temperature by retarding exhaust valve timing.

In other embodiments, fumigated system 120 is not required and engine 100 operates continuously in direct injection mode. In a preferred embodiment fuel supply system 140 supplies a gaseous fuel, such as natural gas but other gaseous fuels may be employed. Under certain high load conditions the tip temperature of direct fuel injector 130 may increase above a predetermined maximum value, even with gaseous fuel continuously cycling through the injector. Under these conditions it is advantageous to employ the technique of advancing intake valve timing.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of fuel system protection for an internal combustion engine, comprising:
    introducing a directly injected fuel into a combustion chamber through a direct fuel injector;
    introducing a fumigated fuel upstream of an intake valve associated with the combustion chamber; and
    selectively operating said internal combustion engine with at least one of said directly injected fuel and said fumigated fuel; and
    while operating said internal combustion engine with only said fumigated fuel:
    determining a temperature as a function of engine operating parameters of said direct fuel injector that directly injects fuel into said combustion chamber;
    advancing intake valve timing of said intake valve of the combustion engine from a normal intake valve timing to an advanced intake valve timing when said temperature rises above a first predetermined value such that a duration of an overlap when the intake valve is open and an exhaust valve of said combustion chamber is open increases;
    increasing concentration of exhaust gas in the combustion chamber by trapping the exhaust gas in the combustion chamber;
    holding intake valve timing of the intake valve at said advanced intake valve timing until said temperature is below a second predetermined value; and
    returning intake valve timing of the intake valve to said normal intake valve timing from said advanced intake valve timing after said temperature is below said second predetermined value.

2. The method of claim 1, wherein said temperature is a transient temperature, said method further comprising:
    determining a steady state temperature of said direct fuel injector as a function of engine operating parameters;
    determining said transient temperature of said direct fuel injector as a function of said steady state temperature;
    wherein said first predetermined value and said second predetermined value are related by one of:
        said first predetermined value is greater than said second predetermined value;
        said first predetermined value is less than said second predetermined value; and
        said first predetermined value is equal to said second predetermined value.

3. The method of claim 1, wherein a portion of exhaust gases enter an intake manifold from the combustion chamber when the intake valve opens with the advanced intake valve timing.

4. The method of claim 1, wherein said first predetermined value is greater than said second predetermined value.

5. The method of claim 1, wherein said engine operating parameters are determinative of directly injected fuel quantity and fumigated fuel quantity introduced into said combustion chamber and frequency with which said fuel quantities are introduced.

6. The method of claim 1, further comprising retarding exhaust valve timing of the exhaust valve as a function of engine operating conditions such that said temperature is maintained below said second predetermined value.

7. The method of claim 6, wherein said engine operating conditions comprise engine speed, engine load and intake valve timing.

8. The method of claim 1, further comprising advancing ignition timing such that at least one of fuel consumption of said internal combustion engine and turbine inlet temperature are reduced.

9. The method of claim 1, wherein said engine operating parameters comprise at least two of engine speed, air mass flow, engine coolant temperature, equivalence ratio, spark timing, combustion phasing, manifold air temperature, effective EGR rate, intake charge oxygen concentration, trapped oxygen mass, fumigated fuel mass fraction, and directly injected fuel mass fraction.

10. The method of claim 1, wherein said directly injected fuel is selected from the group consisting of natural gas, gasoline, ethanol-gasoline blends and diesel, and said fumigated fuel is selected from the group consisting of gasoline, ethanol-gasoline blends, natural gas, ethane, methane, propane, biogas, landfill gas, dimethyl ether, hydrogen and known mixtures thereof.

11. The method of claim 1, wherein the intake valve closes closer to bottom dead center in a compression stroke when opened with the advanced intake valve timing compared to being opened with the normal intake valve timing.

12. The method of claim 1, wherein ignition timing remains the same between the normal intake valve timing and the advanced intake valve timing.

13. The method of claim 1, wherein an effective compression ratio increases when the intake valve timing is advanced.

14. The method of claim 1, wherein said directly injected fuel is different from said fumigated fuel.

15. The method of claim 1, wherein said engine operating parameters in said function of engine operating parameters for determining said temperature include a directly injected fuel mass fraction and/or a fumigated fuel mass fraction.

16. The method of claim 1, wherein the increasing concentration of exhaust gas in the combustion chamber by trapping the exhaust gas in the combustion chamber includes drawing the exhaust gas into an intake manifold of the combustion chamber and reintroducing the exhaust gas into the combustion chamber with the fumigated fuel and air.

17. An apparatus for fuel system protection in an internal combustion engine comprising:
  a direct fuel injector for introducing a directly injected fuel into a combustion chamber of said internal combustion engine;
  a fumigation system for introducing a fumigated fuel upstream of an intake valve of said combustion chamber; and
  a controller programmed to:
    selectively introduce said directly injected fuel through said direct fuel injector and said fumigated fuel through said fumigation system; and
    while operating said internal combustion engine with only said fumigated fuel:
      determine a temperature of said direct fuel injector as a function of engine operating parameters;
      advance intake valve timing of an intake valve of the internal combustion engine from a normal valve timing to an advanced intake valve timing when said temperature rises above a first predetermined value such that a duration of an overlap when the intake valve is open and an exhaust valve of said combustion chamber is open increases;
      increase concentration of exhaust gas in the combustion chamber by trapping the exhaust gas in the combustion chamber;
      hold intake valve timing of the intake valve at said advanced intake valve timing until said temperature is below a second predetermined value; and
      return intake valve timing of the intake valve to said normal intake valve timing from said advanced intake valve timing after said temperature is below said second predetermined value.

18. The apparatus of claim 17, wherein said first predetermined value is greater than said second predetermined value.

19. The apparatus of claim 17, wherein said controller is further programmed to, in addition to or instead of advancing intake valve timing of the intake valve, retard exhaust valve timing of the exhaust valve as a function of engine operating conditions such that said temperature is maintained below said second predetermined value.

20. The apparatus of claim 17, wherein said controller is further programmed to advance ignition timing such that at least one of fuel consumption of said internal combustion engine and turbine inlet temperature are reduced.

21. The apparatus of claim 17, wherein the increase concentration of exhaust gas in the combustion chamber by trapping the exhaust gas in the combustion chamber includes drawing the exhaust gas into an intake manifold of the combustion chamber and reintroducing the exhaust gas into the combustion chamber with the fumigated fuel and air.

22. The apparatus claim 17, wherein the intake valve closes closer to bottom dead center in a compression stroke when opened with the advanced intake valve timing compared to being opened with the normal intake valve timing.

23. The apparatus of claim 17, wherein ignition timing remains the same between the normal intake valve timing and the advanced intake valve timing.

24. The apparatus of claim 17, wherein an effective compression ratio increases when the intake valve timing is advanced.

25. The apparatus of claim 17, wherein said directly injected fuel is different from said fumigated fuel.

26. The apparatus of claim 17, wherein said engine operating parameters in said function of engine operating parameters for determining said temperature include a directly injected fuel mass fraction and/or a fumigated fuel mass fraction.

27. A method of fuel system protection for an internal combustion engine comprising:
  during calibration of said internal combustion engine:
    introducing a directly injected fuel into a combustion chamber through a direct fuel injector;
    introducing a fumigated fuel upstream of an intake valve; and
    selectively operating said internal combustion engine with at least one of said directly injected fuel and said fumigated fuel; and
    while operating said internal combustion engine with only said fumigated fuel:
      determining a temperature as a function of engine operating parameters of said direct fuel injector that directly injects fuel into said combustion chamber;
      calibrating said engine to advance intake valve timing of said intake valve of the combustion engine from a normal intake valve timing to an advanced intake valve timing when said temperature rises above a first predetermined value such that a duration of an overlap between when the intake valve is open and an exhaust valve of said combustion chamber is open increases;
      increasing concentration of exhaust gas in the combustion chamber by trapping the exhaust gas in the combustion chamber;
      holding intake valve timing of the intake valve at said advanced intake valve timing until said temperature is below a second predetermined value; and
      returning intake valve timing of the intake valve to said normal intake valve timing from the advanced intake valve timing after said temperature is below said second predetermined value;
  during normal operation of said internal combustion engine:
    determining said temperature of said direct fuel injector as a function of engine operating parameters; and
    performing a temperature mitigation technique when said temperature rises above a third predetermined value such that said temperature is maintained below a fourth predetermined value.

28. The apparatus of claim 27, wherein said directly injected fuel is different from said fumigated fuel.

29. The apparatus of claim 27, wherein said engine operating parameters in said function of engine operating parameters for determining said temperature include a directly injected fuel mass fraction and/or a fumigated fuel mass fraction.

30. The method of claim 27, wherein the increasing concentration of exhaust gas in the combustion chamber by trapping the exhaust gas in the combustion chamber includes drawing the exhaust gas into an intake manifold of the combustion chamber and reintroducing the exhaust gas into the combustion chamber with the fumigated fuel and air.

* * * * *